US005878399A

United States Patent [19]

Peralto

[11] Patent Number: 5,878,399

[45] Date of Patent: Mar. 2, 1999

[54] COMPUTERIZED VOTING SYSTEM

[76] Inventor: Ryan G. Peralto, 40 Paddington Terrace, Kingston, Jamaica

[21] Appl. No.: 695,394

[22] Filed: Aug. 12, 1996

[51] Int. Cl.[6] ........ G06F 17/60

[52] U.S. Cl. ........ 705/12; 235/50 A; 235/51; 235/386; 283/75

[58] Field of Search ........ 705/12; 235/51, 235/386, 50 A; 283/75; 156/277

[56] References Cited

U.S. PATENT DOCUMENTS

| | | | |
|---|---|---|---|
| 5,218,528 | 6/1993 | Wise et al. | 705/12 |
| 5,497,318 | 3/1996 | Miyagawa et al. | 705/12 |
| 5,505,494 | 4/1996 | Belluci et al. | 283/75 |
| 5,583,329 | 12/1996 | Davis III et al. | 235/50 A |
| 5,610,383 | 3/1997 | Chumbley | 235/386 |
| 5,635,012 | 6/1997 | Belluci et al. | 156/277 |
| 5,657,389 | 8/1997 | Houvener | 380/23 |
| 5,732,222 | 3/1998 | Miyagawa et al. | 235/51 |

*Primary Examiner*—Allen R. MacDonald
*Assistant Examiner*—Jagdish Patel
*Attorney, Agent, or Firm*—John L. James

[57] ABSTRACT

A computerized voting system has a central computer, regional computers and voting modules connected to a data transfer link for communication with one another. The voting modules access the central computer database under control of the central computer control center. Voter data is created at one of the voting modules and communicated to the database for storage. Input voter data for a given voter at any one of the plurality of voting modules during an election is compared to the stored data for the given voter to verify that the given voter is eligible to vote. Access to the stored voter data for the given voter during an election is restricted to prevent the given voter from voting more than once during the election.

19 Claims, 3 Drawing Sheets

COMPUTERIZED VOTING SYSTEM

TECHNICAL FIELD OF THE INVENTION

The present invention pertains generally to a voting machine, and, more particularly, to a method and apparatus for positive identification of voters to prevent duplicate or fraudulent voting.

BACKGROUND OF THE INVENTION

Voting machines have been used for years to accept, record and tabulate votes cast during an election so that election results can be available in a matter of a few hours instead of the several hours or days that were once necessary. Voting machines have eliminated some voting irregularities, such as the problem of stuffing ballot boxes, that existed with paper ballots. More modem voting machines can tabulate votes and have election results available within a few minutes after the polls are closed. While modern voting machines speed the voting process, problems still exist.

One problem is ensuring that the person voting is actually the registered person entitled to vote and not an impostor. Sometimes, voter identification is not checked at the polling place. At other times, identification is verified by comparing a voter's vehicle driver's license or passport against the registered voter list. While this process is helpful, a driver's license picture does not always clearly resemble the person, and it does not guard against a forged driver's license or passport. Accordingly, it will be appreciated that it would be highly desirable to have a form of identification that is more definitive than a driver's license or passport photograph.

Another problem is ensuring that a voter votes only once. Sometimes, a voter's name is checked against the registered voter list at the single polling place where the voter is entitled to vote. While helpful, it does not eliminate the problem because a person's name may fail to appear on the voter's list for a number of reasons. When a name fails to appear, a voting official calls to determine whether a person is entitled to vote. When a person changes addresses resulting in a change of polling places and his name is omitted from the list at the new polling place, a call is made and the person allowed to vote at the new place. Sometimes, when the name is absent from the list at the new voting place, it is still on the list at the old voting place which makes it possible for a person to vote twice. In some places, a voter may vote at any one of several polling places thereby creating the potential for a voter to cast multiple votes. Accordingly, it will be appreciated that it would be highly desirable to have a master voter list to which individual voter lists at polling sites are linked to prevent duplicate voting.

SUMMARY OF THE INVENTION

The present invention is directed to overcoming one or more of the problems set forth above. Briefly summarized, according to one aspect of the invention, a computerized voting system comprises a central computer having a control center and a database, a data transfer link connected to the central computer, a plurality of voting modules connected to the central computer via the data transfer link and accessing the database under control of the control center, means for creating voter data at one of the plurality of voting modules and communicating the voter data to the database for storage, means for inputting voter data for a given voter at any one of the plurality of voting modules during an election for comparing the input data for the given voter to the stored voter data in the database and verifying the given voter is eligible to vote, and means for restricting access to the stored voter data in the database for the given voter during an election to prevent the given voter from voting more than once during the election.

The voter identification data may include one or more positive identifiers such as finger prints, digital images or signatures which may appear on voter identification cards. When appearing at the voting site, data from a voter's identification card is input along with a live finger print or live signature to determine whether the voter is registered to vote and registered to vote at that site. A voter registered to vote at that site may then enter a voting booth where a live finger print is again input before making candidate selections. When the vote is cast, the voter is locked out of the databases to prevent casting more than one vote. Regional databases are used in large systems to speed verifying voter data and outputting results.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE PREFERRED EMBODIMENTS

Figure 1:
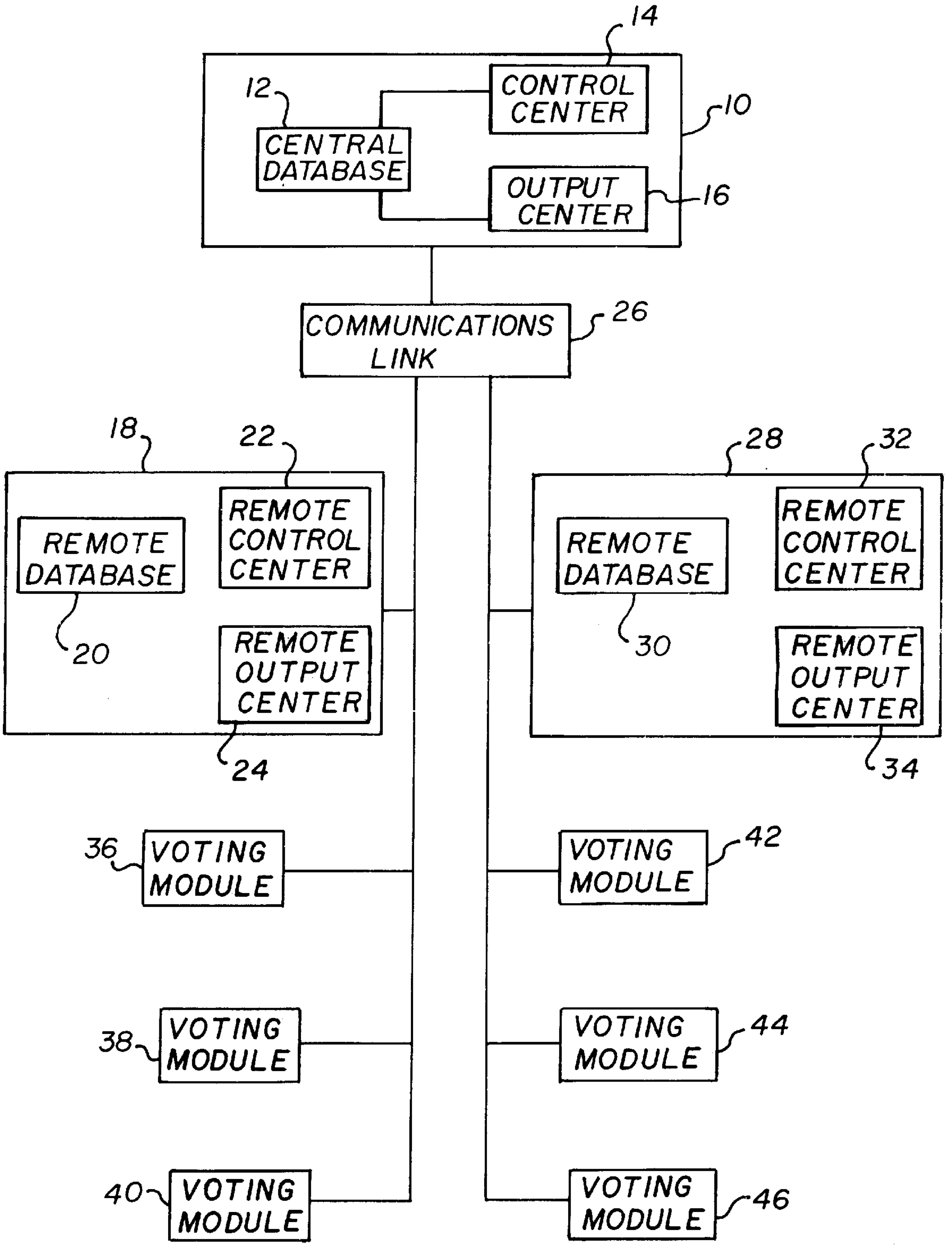
FIG. 1 is block diagram of a preferred embodiment of computerized voting system illustrating a central computer with a database, regional computer with a database, and voting modules connected via a communications link to one another according to the present invention.

Referring to FIG. 1, a computerized voting system has a central computer 10 that contains a central database 12, a control center 14 and an output center 16. Central database 12 is capable of storing various information on the voting population by name, address, finger print, picture, signature, and other demographic information. Database 12 also stores information on candidates, political parties or other voting choices for which the system is used. Control center 14 controls the inflow of data to the database 12 and outflow of data from the database 12. The output center 16 prints or otherwise outputs voting results and can print voter and candidate information as desired.

A regional computer 18, similar to the main computer 10 but with less capacity, has a database 20, a control center 22 and an output center 24 for rendering voting results. The regional computer 18 is connected to the central computer 10 by a secure, bi-directional communications link 26 that transfers data between the central and regional computers and other devices connected to it. Another regional computer 28 also has a database 30, a control center 32 and an output center 34 and is connected to central computer 10 via communications link 26. Although two regional computers are shown to illustrate the invention, the exact number may vary from zero, where there is a small voting system handled entirely by the central computer, to several, for a larger voting system for a larger population, denser population, or widely scattered population.

A plurality of voting modules 36, 38, 40 are connected to the central computer 10 via communications link 26 for accessing the database 20 of regional computer 18 under control of its control center 22 and also to access central database 12 of the central computer 10 under control of its control center 14. Voting modules 36, 38, 40 form a group of voting modules that is associated with regional computer 18. The association allows the voting modules 36, 38, 40 to access data in the database 20 of regional computer 18. This data is preferably a duplicate or subset of the data stored in the central database 12 pertaining to the voters in the area covered by regional computer 18 and voting modules 36, 38, 40. For its area, the regional computer and its associated voting modules form a complete voting system.

Similarly, voting modules 42, 44, 46 form a group of voting modules that is associated with regional computer 28. The number of voting modules in a group and the number of groups will vary according to the size of the voting system which is determined by the number of voters and their geographical locations. With the group arrangement, it is possible for a voter to vote at any module in a group of modules allowing voters to vote at locations where they feel more comfortable and secure, or at locations that are more easily accessed or less busy. A voter in the group containing voting module 36 cannot vote in the group containing voting module 42 without accessing the central computer 10 to permit the transaction. Data from regional database 20 of regional computer 18 can be transferred to or accessed by the database 30 of regional computer 28 only by authorization and cooperation of the main computer 10. Group to group data transfer is controlled by the central computer.

The computerized voting system can be used for countrywide elections. For example, in a country, the central computer could be located in the capitol city with regional computers and associated voting modules located in cities throughout the country and in rural areas as well. In a city where population is more concentrated, a regional computer will have several voting modules associated with it and there may be more than one regional computer for the city. Voters can vote at any voting module in a group and thereby choose either the most accessible voting module, the module with the shortest waiting line, or the module providing the most comfort, familiarity and security.

Figure 2:
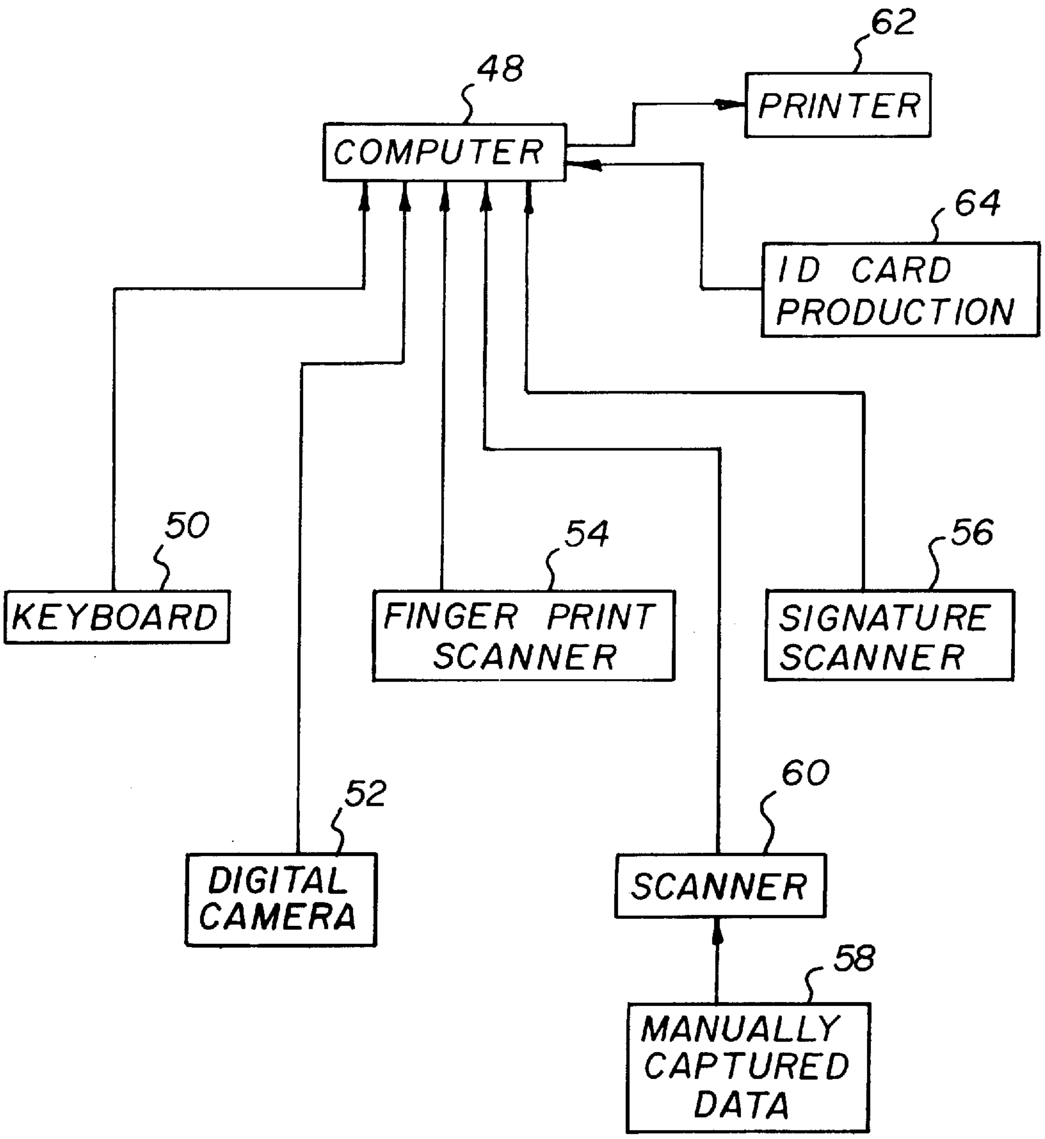
FIG. 2 is a block diagram illustrating the electronic capture of identification data and production of ID cards.

Referring now to FIG. 2, the computerized electronic capture of the identification data and the production of the ID card system, as a part of the voting system, features positive voter identification by relying on finger print data, digital picture data, signature data and demographic data. Data is input to a computer 48 which may be the central computer, one of the regional computers or a computer at one of the voting modules. The computer receives input in various ways from various sources. A keyboard 50 is used to capture demographic information and input it to the computer 48. A digital camera 52 captures a digital image of the voter and inputs the information into computer 48. A finger print scanner 54 and a signature scanner 56 scan information into the computer. The keyboard 50, digital camera 52, finger print scanner 54 and signature scanner 56 capture data electronically for input to the computer.

Data may also be manually captured at manually captured data station 58 and input into the computer using a scanner 60. Manually capturing voter data includes using a form on which demographic information is printed in specified places. The form contains a space to attach a photograph from a regular camera. The form also contains spaces for finger prints and signatures. The form and photograph can be given an identification number and the completed form sent for the electronic capture of the data by the scanner 60. Once data is input to computer 48, a voter list can be assembled and output by printer 62 and an identification card can be produced in an identification production unit 64.

Figure 3:
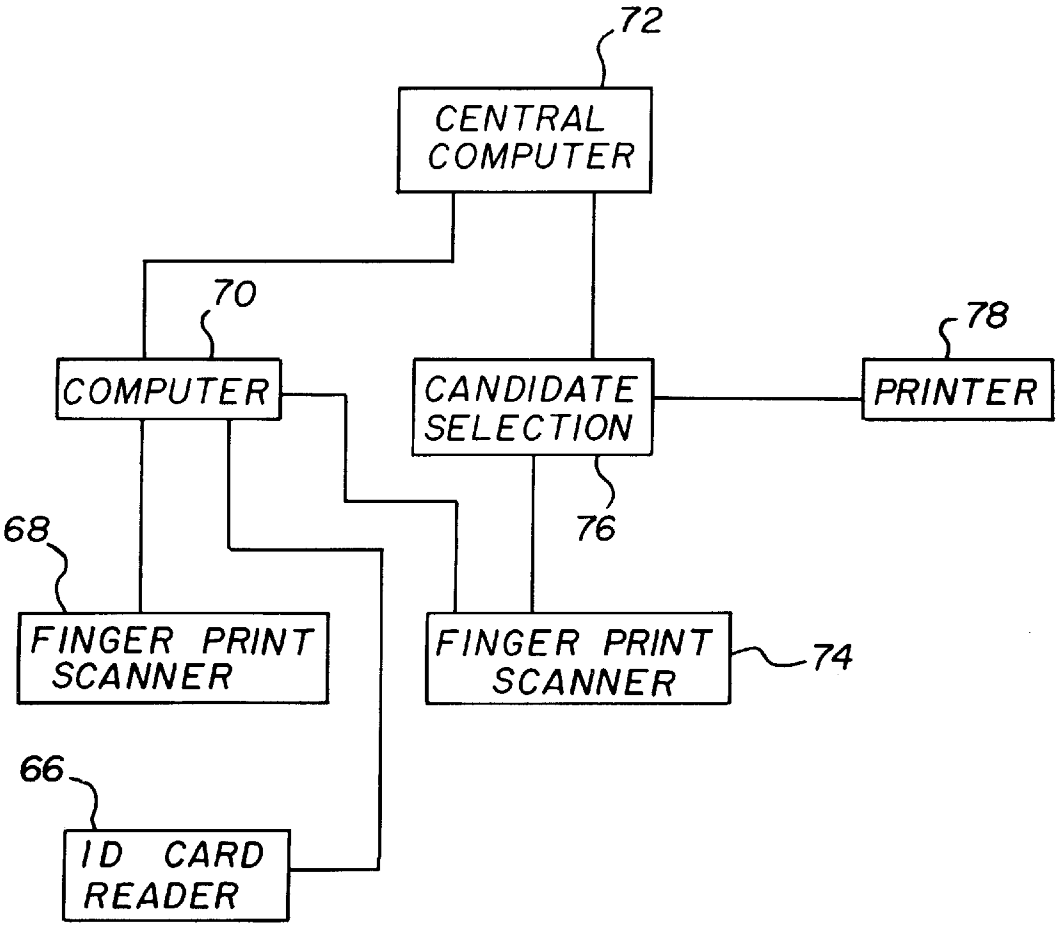
FIG. 3 is a block diagram of one of the voting modules of FIG. 1 illustrating identifying a voter and recording voter's choices.

FIG. 3 illustrates the voting module and the process of voting. When it is time to vote, a voter goes to a voting module that contains an identification section and a voting machine section. The identification section includes and identification card reader 66 that reads the data on the identification card and a temperature sensitive finger print scanner that scans a live finger print. This data is input to a computer 70 at the site, which may or may not have voter data stored in its database. If data is in the database of the computer 70 at the voting module, then the input finger print and identification card data is compared with the database to determine whether the voter identified by the finger print and identification card is a registered voter entitled to vote in the election. If the data is not in the database of computer 70, then the regional computer for that group is accessed and checked to verify whether the voter is registered and entitled to vote. If the data is not available from the regional computer for the voting module group, it means the voter is not eligible to vote in the voting modules for that group, but may be eligible to vote elsewhere. If the voter has somehow come to the wrong group, the computer can access the central computer to check its database to determine where the voter is eligible to vote and direct the voter to that location.

When given permission by computer 70, the voter enters one of several voting machines at the voting module. Another live finger print scanner 74 at the voting module scans the voter's finger print and checks it against the database in computer 70. At this time, the voter is in the privacy of the voting booth, and, when the finger print is verified, the computer 70 communicates with the central computer 72 to prevent further access to that voter's data. The voter then makes his selections at the candidate selection section 76 of the voting booth which can be button, levers or other means of selecting candidates.

Once the candidate selections are made, the selections are sent to the site computer 70 and the central as well as regional computers so that access for that voter is prohibited to thereby prevent the voter from voting more than once. Should the voter change his mind after his finger print is scanned by scanner 74 prior to making candidate selections, the central computer will be alerted allowing the voter to complete the voting process. Candidate selections are made by making all selections and operating a button, lever or switch after all selections are made. Preferably, after the button, lever or switch is operated, the voting machines will query the voter to make certain all selections have been made before the vote is recorded. Voting results are tabulated and can be printed by local printer 78 as well as by the output centers of the regional computers and central computer.

It can now be appreciated that a computerized voting system has been presented that facilitates both the enumeration and voting processes. Enumeration is the process of data gathering to produce a clean and reliable voter list. A potential voter is electronically identified by reading his live finger print and matching that finger print against all other finger prints stored in the database for registration purposes. Additional electronic identification can be accomplished by comparing name, address, and picture of the voter. The finger print and additional data is used to identify bona fide voters and to identify duplicate registrations in order to produce a clean database and voters list to be subsequently used for identification purposes and for voting.

Only authorized personnel are permitted entry to activate the database programs to operate the voting system for data storage, data changes, data manipulation and file closing. For security, live fingerprint identification is used as a password for access. The system programs ensure that the computer records all transactions and identifies by finger print all persons who activate the system and process data, as well as the date and time of each transaction.

The final approved database of voters is securely stored on the computer hard drive and/or an optical disk using authorized finger prints. To verify voters to permit voting, persons listed in the database at the time of voting have their live finger prints electronically checked against that stored in the database.

Once a person is positively identified as being part of the database, the voting module enables that person, and that person alone, to access the voting system using his finger print. The voter then selects the candidate or political party of choice, votes for that choice, and gets a receipt acknowledging that the vote has been recorded. The voting information is recorded at the voting station and transmitted simultaneously for storage at the associated regional computer and the central computer. At this time, the voter's database becomes inaccessible throughout the voting system to prevent duplicate voting. At the end of voting, the system can provide the count of votes for each candidate, the total votes cast, and the names of all persons who voted, with appropriate printouts at each voting station.

The central database can store identification information on all voters by name, address, finger print, picture and the like and can record on all activities submitted by the regional computers and voting modules. The central computer has the ability to activate, access, terminate, and monitor the operation of all regional computer and voting modules for the opening and closing of the polls; receive, process and store for final count the individual votes received from voting modules; and provide voting results with appropriate printouts for each constituency.

The voting modules compare identification information by matching the live finger print of the voter with that stored in the database to permit voting. After positively identifying the voter by matching his live finger print, they provide access to different ballot choices to select candidate, party, constituency and division. They record the bona fide voter's voting choice and reject any attempt at bogus voting; print a receipt acknowledging voter's name and the fact that the vote has been recorded; send to the central computer and/or regional computer information about the individual voter's actions; and provide, at the end of voting, the count of votes for each candidate and total ballots polled at that module with an appropriate printout.

The present invention thus facilitates the registration and identification of a bona fide voter, creates a clean voter's list by cross matching the finger prints, prevents unregistered persons from voting, and prevents duplicate voting. The problems of stuffing of ballot boxes and tampering with the vote count are avoided because voters are positively identified and prevented from voting more than once and the voting results are computer tabulated. The system rejects any attempt to vote by a person whose finger print is not in the database or who has already voted in the election. It allows persons to choose one of several voting stations where they can feel free from intimidation or threat by providing a choice to vote at more than one station. The system is capable of printing a list of the names of the persons who voted and a tally of the final results of voting.

While the invention has been described with particular reference to the preferred embodiment, it will be understood by those skilled in the art that various changes may be made and equivalents may be substituted for elements of the preferred embodiment without departing from the invention. For example, while finger print identification is believed to be very highly reliable, the system is adaptable to hand prints, thermal patterns, DNA and other forms of identification as well. In addition, many modifications may be made to adapt a particular situation and material to a teaching of the invention without departing from the essential teachings of the present invention.

As is evident from the foregoing description, certain aspects of the invention are not limited to the particular details of the examples illustrated, and it is therefore contemplated that other modifications and applications will occur to those skilled in the art. For example, the computerized voting system is adaptable to other uses, such as a security system for military installations, schools, hospitals or the like, or as an inventory control system for aircraft parts, or controlled substances and parts, for example. It is accordingly intended that the claims shall cover all such modifications and applications as do not depart from the true spirit and scope of the invention.

What is claimed is:

1. A voting system, comprising:

a central computer having a control center, an output center and a database;

a secure data transfer link connected to said central computer;

a plurality of voting modules connected to said central computer via said data transfer link, said voting modules accessing said database under control of said control center;

means for creating voter data, including positive identification data, at one of said plurality of voting modules and communicating said voter data to said database for storage;

means for inputting voter data for a given voter, including positive identification data, at any one of said plurality of voting modules during an election for comparing said input data for said given voter to said stored voter data in said database to verify voter eligibility; and means for restricting access to said stored voter data in said database for said given voter during an election to prevent said given voter from voting more than once during the election.

2. A voting system, as set forth in claim 1, including:

a regional computer having a regional control center and a regional database and being connected to said central computer and selected ones of said voting modules via said data transfer link, said selected ones of said voting modules accessing said regional database under control of said regional control center;

means for creating voter data at one of said selected ones of said plurality of voting modules and communicating said voter data to said regional database for storage;

means for inputting voter data for a given voter at any one of said selected ones of said plurality of voting modules during an election for comparing said input data for said given voter to said stored voter data in said regional database and verifying said given voter is eligible to vote; and means for restricting access to said stored voter data in said regional database for said given voter during an election to prevent said given voter from voting more than once during the election.

3. A voting system, as set forth in claim 1, including:

a regional computer having a regional control center and a regional database and being connected to said central computer and selected ones of said voting modules via said data transfer link, said selected ones of said voting modules accessing said regional database under control of said regional control center; and means for transferring voter data from said central database to said regional database for voters authorized to vote at one of said selected ones of said plurality of voting modules.

4. A voting system, as set forth in claim 1, wherein said means for creating voter data includes a digital camera.

5. A voting system, as set forth in claim 1, wherein said means for creating voter data includes a finger print scanner.

6. A voting system, as set forth in claim 1, wherein said means for creating voter data includes a signature scanner.

7. A voting system, as set forth in claim 1, wherein said means for creating voter data includes means for producing a voter identification card.

8. A voting system, as set forth in claim 7, including a live finger print scanner and an electronic signature pad for verifying person receiving said identification card is person identified by said card.

9. A voting system, as set forth in claim 1, wherein said means for creating voter data includes:

a keyboard for inputting demographic information;

a digital camera for capturing a facial image;

a finger print scanner for capturing a finger print;

a signature scanner for capturing a hand written signature; and means for producing a voter identification card containing demographic information, a facial image, a fingerprint and a signature.

10. A voting system, as set forth in claim 1, wherein each of said voting modules includes:

an identification section containing a live finger print scanner for scanning a potential voter's finger print and comparing it with stored finger print data; and a voting machine having a live finger print scanner for scanning a potential voter's finger print and comparing it with stored finger print data from said database of said central computer.

11. A voting system, as set forth in claim 10, including means for outputting a summary of voting results.

12. A voting system, comprising:

a central computer having a control center, an output center for rendering voting results, and a database;

a plurality of regional computers each having a control center, an output center for rendering voting results, and a database a secure, bi-directional data transfer link connecting said central computer and regional computers;

a plurality of voting modules connected to said central computer via said data transfer link and accessing said database under control of said control center, said plurality of voting modules being divided into several groups equal in number to the number of regional computers with each group associated with a selected one of said regional computers and accessing its database under control of its control center;

means for creating voter data, including positive identification data, at one of said plurality of voting modules and communicating said voter data to said central database for storage;

means for inputting voter data for a given voter, including positive identification data, at any one of said plurality of voting modules during an election for comparing said input data for said given voter to said stored voter data in said database and verifying said given voter is eligible to vote; and means for restricting access to said stored voter data in said database for said given voter during an election to prevent said given voter from voting more than once during the election.

13. A voting system, as set forth in claim 12, wherein said means for creating voter data includes a digital camera.

14. A voting system, as set forth in claim 12, wherein said means for creating voter data includes a finger print scanner.

15. A voting system, as set forth in claim 12, wherein said means for creating voter data includes a signature scanner.

16. A voting system, as set forth in claim 12, wherein said means for creating voter data includes means for producing a voter identification card.

17. A voting system, as set forth in claim 16, including a live finger print scanner and an electronic signature pad for verifying person receiving said identification card is person identified by said card.

18. A voting system, as set forth in claim 12, wherein said means for creating voter data includes:

a keyboard for inputting demographic information;

a digital camera for capturing a facial image;

a finger print scanner for capturing a finger print;

a signature scanner for capturing a hand written signature; and means for producing a voter identification card containing demographic information, a facial image, a fingerprint and a signature.

19. A voting system, as set forth in claim 12, wherein each of said voting modules includes:

an identification section containing a live finger print scanner for scanning a potential voter's finger print and comparing it with stored finger print data; and a voting machine having a live finger print scanner for scanning a potential voter's finger print and comparing it with stored finger print data from said database of said central computer.

* * * * *